Sept. 3, 1968  N. R. SPARKS  3,399,745
RECORDING ELASTIC WAVES WITH VARYING TRAVEL TIMES
Filed May 4, 1967  3 Sheets-Sheet 3

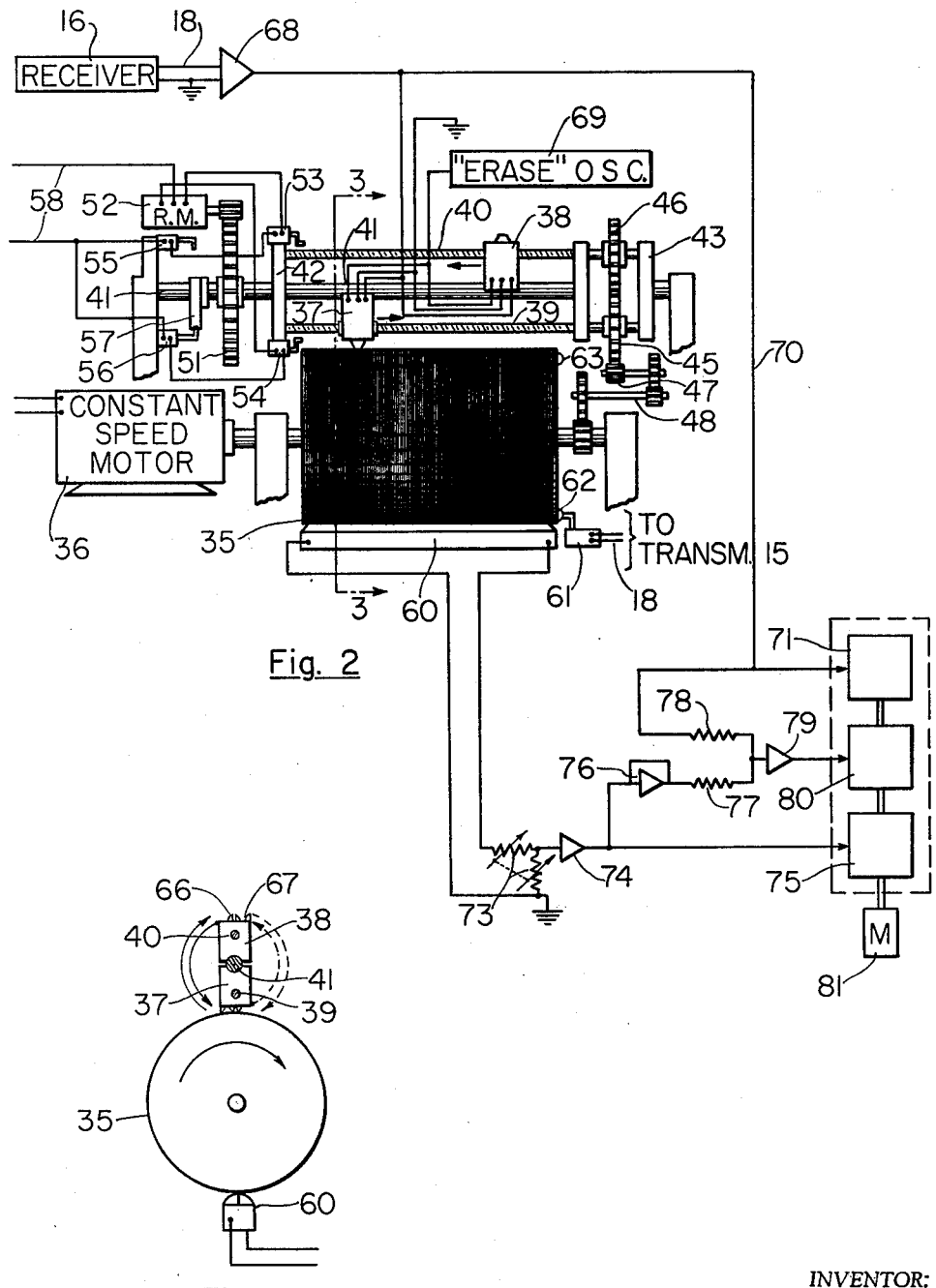

INVENTOR:
NEIL R. SPARKS
BY Newell Potter
ATTORNEY

United States Patent Office 3,399,745
Patented Sept. 3, 1968

3,399,745
RECORDING ELASTIC WAVES WITH
VARYING TRAVEL TIMES
Neil R. Sparks, Tulsa, Okla., assignor to Pan American Petroleum Corporation, Tulsa, Okla., a corporation of Delaware
Filed May 4, 1967, Ser. No. 636,106
12 Claims. (Cl. 181—.5)

ABSTRACT OF THE DISCLOSURE

Seismic, acoustic, or elastic wave events traveling with constant amplitude and travel times between a moving pulsed transmitter and receiver are cancelled by reproducibly recording many received-signal traces, reproducing them simultaneously as an average or composite signal in synchronism with the next-received signals, subtracting the received and the composite signals with proper relative amplitudes to cancel the constant events, and displaying the remainder wave trace to show varying travel-time events that may otherwise be obscured. Preferably, when each received signal is reproducibly recorded for subsequent compositing, the oldest one of the previously composited traces is erased.

Background of the invention (1) *Field of the invention.*—This invention relates to the recording and/or display of repetitive seismic, acoustic or elastic waves that travel through intervening media by various paths between a moving wave or pulse transmitter and receiver maintained at constant spacing, so as to emphasize or reveal events for which the travel time varies with the source-receiver position, and which may be obscured by other events for which the travel time and amplitude remain substantially constant. Although the invention is especially applicable and will be described with reference to seismic or acoustic well logging, it is also useful in the recording of other kinds of elastic-wave explorations or investigations, such as in determining weathering in seismic prospecting, marine sonar and seismic explorations, and the like.

(2) *Description of the prior art.*—In the logging of well formations for their acoustic or seismic wave-transmitting properties, the most common method of recording has involved automatically picking the first-arriving waves and recording their travel times to one or more receivers as an indication from which the compressional seismic-wave velocity of the formation can be inferred. In such recording, whatever information is carried by the amplitudes and arrival times of other waves than those first arriving is discarded and lost. While there were some efforts to record certain amplitude or amplitude-ratio characteristics of the various wave arrivals, the recording of these additional characteristics gained only relatively limited acceptance until the development of a variable-density mode of presentation, as described in U.S. Reissue Patent 25,928. The commercial development of this form of logging presentation and a number of examples of its use were described in a technical paper by H. W. Lawrence presented before the Society of Exploration Geophysicists. An abstract of this paper appears in Geophysics for December 1965, volume 30, No. 6, at page 1239.

Experience gained in the use of this method of acoustic well-log recording has shown that, besides the first refracted compressional wave arrivals utilized for velocity or travel-time measurement from the beginning of commercial acoustic logging, many other wave arrivals can be identified, such as the compressional waves transmitted through the borehole liquids, the boundary or tube wave traveling along the borehole wall, shear waves transmitted by the formations, and many others. Also arrivals of various combinations of these waves over paths both direct and indirect can sometimes be seen, the latter sometimes involving reflections at discontinuities between strata or spaced at some lateral distance from the borehole.

Some of these additional wave arrivals, notably those transmitted through the borehole liquids and in some instances the boundary wave or combinations of these two, may be of quite large amplitude and of substantial duration so as to obscure weaker wave arrivals of interest which they overlap in time. Often, however, these strong waves are quite constant in amplitude and travel time over large intervals of borehole depth, and it is a primary object of this invention to utilize these characteristics to discriminate against these waves and permit clearer recording of other waves of varying travel time which they may obscure.

Summary of the invention

Briefly stated, the suppression of the wave arrivals of constant amplitude and travel time in elastic-wave recording is accomplished by reproducibly recording a large number of received-wave traces, each corresponding to one transmission through the medium from a repetitively actuated source, and then simultaneously reproducing the recorded traces as an average or composite signal in synchronism with the receipt of each subsequent wave transmission. Upon proper adjustment of the relative amplitudes of the composite and of the received-wave trains, the two are subtractively combined so that the constant travel-time events in the received-wave trace are substantially cancelled, leaving a remainder trace to show the events of varying travel time free of interference. When each received-wave trace is reproducibly recorded for subsequent compositing, the oldest of the previously composited traces is removed. Thus, depending on the number of traces utilized in compositing, some choice is possible as to how rapidly an event must vary to be recorded or, conversely, how nearly constant it must remain in arrival time and amplitude to be strongly discriminated against.

Brief description of the drawings

This will be better understood by reference to the accompanying drawings forming a part of this application, in which drawings:

FIGURE 2 is a diagrammatic elevation view of a preferred form of recording apparatus;

FIGURE 3 is a cross-section view of the apparatus of FIGURE 2 on line 3—3; and

Description of the preferred embodiment(s)

Figure 1:
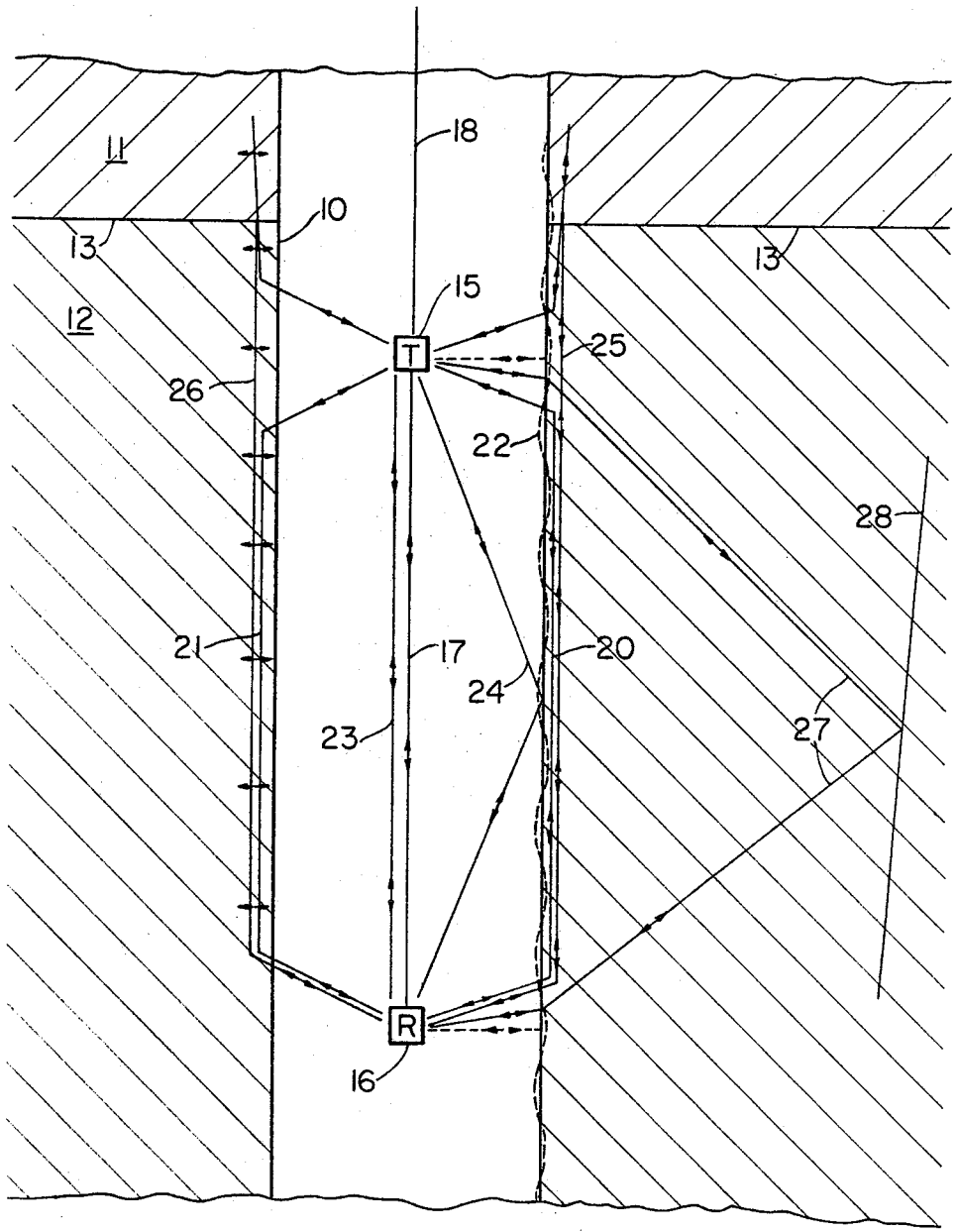
FIGURE 1 is a diagrammatic earth cross-section showing the paths of some of the typical waves observed in well logging.

Referring now to these drawings in detail and particularly to FIGURE 1, in this figure is shown in highly diagrammatic form an earth cross-section penetrated by a borehole 10 extending through formations 11 and 12 having between them a discontinuity or boundary 13. An acoustic or velocity logging instrument is shown in highly schematic form as comprising a transmitter 15 and a receiver 16 in borehole 10, spaced a fixed distance apart by a connecting structure 17 and suspended by a cable 18 over which signals are transmitted to and from the ground surface (not shown) in a way well known in the well-logging art. As the down-hole logging instrument may be entirely conventional and its details of construction are not important to an understanding of this invention, no further description of it is believed necessary here.

Assuming that borehole 10 is liquid-filled, a number of the possible wave-travel paths for various modes of elastic-wave transmission are shown. The small arrowheads on the ray-path lines correspond generally to the particle-motion directions in the medium involved. Thus, only compressional waves with longitudinal particle motion are shown in the liquid surrounding transmitter 15 and receiver 16, but the energy carried in this form to and from the walls of borehole 10 may travel in a variety of different ways through formations 11 and 12.

Path 20 represents the refracted compressional wave that is usually the first arrival relied upon to measure the compressional-wave velocity of the formations such as formation 12. However, another prominent arrival is that by path 21, which is a shear wave with indicated particle motions perpendicular to the direction of wave transmission in the medium 12. Still another prominent form of energy transmission is represented by boundary wave 22, shown in dotted lines as traveling along the interface between the borehole 10 and the formations 11 and 12. It is sometimes accompanied by waves traveling through the borehole liquids more or less by direct paths such as 23 or by reflection from the borehole wall along paths such as 24. In particular, information as to the amplitudes and arrival times of waves along paths 20, 21 and 22 is of considerable interest in establishing the elastic properties of the borehole formations.

In the presence of a prominent interface such as 13, reflected compressional refraction waves may be observed traveling paths such as 25; or reflected shear-wave refractions traveling paths such as 26 may be seen. At times, events which appear to travel paths such as path 27 involving compressional-wave reflection at a discontinuity 28 horizontally spaced from borehole 10 in formation 12 may be observed. While these represent some of the most commonly observed forms of acoustic or elastic energy transmission between a transmitter and receiver in a liquid-filled borehole, these are by no means all that may be observed and that will be of interest in some instances.

Also, there may be recorded electrical cross-feed of signals in the logging or recorder circuits or along cable 18; or acoustical energy may be transmitted over structure 17 directly between transmitter 15 and receiver 16. In general, the energy transmitted by paths 23 and 24, and sometimes by boundary wave 22, will be quite constant in amplitude and travel time over extensive depth intervals of the borehole 10, while travel times over paths 20, 21, 25, 26 and 27 will vary markedly. Likewise, electrical cross-feed such as on cable 18, and acoustical leakage along structure 17, when they exist, will generally be of constant amplitude and travel time.

In FIGURES 2 and 3 is shown a preferred embodiment of apparatus for recording the waves traveling between transmitter 15 and receiver 16 by the various paths, so as to show the wave form both of the total received waves and of the received waves remaining after those of constant amplitude and travel time have been removed. This recording system comprises a magnetic drum 35 rotated at constant speed by a motor 36, on which drum is recorded each trace, as it is received from receiver 16, by a magnetic recording head 37 or 38. Heads 37 and 38 are respectively movable parallel to the axis of drum 35 by the lead screws 39 and 40 along a central guide rod 41. The ends of lead screws 39 and 40 are journaled in the end-supporting bearing members 42 and 43, rotatable with the guide member 41 as an axis so to bring either head 37 or head 38 alternately into recording contact with the surface of drum 35.

Lead screws 39 and 40 are rotated in opposite directions by engaged spur gears 45 and 46 driven by gearing 47 and 48 from the shaft of drum 35. Bearing support member 42 is fixed to guide rod 41, as is also a gear 51 adapted to be driven by a reversible motor 52. Power to rotate motor 52 in one direction is supplied over leads 58 through switches 55 and 53 in series, and for rotation in the opposite direction through the switches 56 and 54 in series. Switch 53 is a normally-open limit switch which is closed by movement of the head 38 to the left along lead screw 40, while switch 54 is also normally open until contacted by movement of head 37 to the extreme left position. Limit switches 55 and 56 are respectively normally closed until contacted by an arm 57 fixed to shaft or guide rod 41 and thereby rotatable with it and with gear 51 by motor 52.

Spaced circumferentially half-way around drum 35 from the position of head 37 is an elongated playback head 60 adapted to intercept magnetic flux from all of the recorded tracks on the surface of drum 35. Also adjacent to drum 35 is a switch 61 adapted to be actuated by projections 62 and 63 to energize the transmitter 15 of the logging or measuring system.

As is shown more clearly in FIGURE 3, recording heads 37 and 38 are provided with two gaps and appropriate windings (not shown), the gap 66 being narrow and acting to record the signals received from the receiver 16 through an amplifier 68, while the wider gap 67, with a winding actuated by an erase oscillator 69, erases a trace of previously recorded information immediately prior to the recording of each new received trace by gap 66.

The signals from receiver 16 and amplifier 68 are also taken by a lead 70 directly to a recorder 71 where they are preferably recorded in variable-density form as described in U.S. Reissue Patent 25,928. The output leads of compositing head 60 are connected through an attenuator 73 to an amplifier 74, the output of which is recorded directly by a recorder 75 which may be similar to 71. The output of amplifier 74 is also transmitted through an inverting amplifier 76 to an adding resistor 77. The receiver signal on lead 70 is similarly applied through an adding resistor 78 to the input of an amplifier 79 which, due to the inversion of the signal from amplifier 74 by inverter 76 produces on a recorder 80 a difference or remainder trace wherein the waves of constant travel time and amplitude in the composite signal of head 60 and in the received signal of receiver 16 have been cancelled. Recording drums 71, 75 and 80 are preferably moved in synchronism by a common drive member 81.

In operation, with drum 35 rotating at constant speed, switch 61 is closed momentarily by contactors 62 and 63 at each half-drum revolution, to trigger transmitter 15 to emit an impulse into the surrounding media. During the half-revolution of drum 35 following the impulse transmission, the resulting train of waves received by receiver 16 is recorded by head 37 as a narrow track along the surface of the drum. At the same time, activated by the lead screw 39 driven by gearing 48, 47, and 45, the head 37 moves slowly to the right in the direction of the arrow so as to stay just clear of the previously recorded narrow track. Simultaneously, the opposite rotation of lead screw 40 by gear 46 moves recording head 38, not in contact with drum 35, to the left. As this process continues, the surface of drum 35 becomes completely filled with consecutively recorded traces, each extending half-way around the drum, and each recorded on a time scale in synchronism with that of the previously recorded traces.

Eventually, as head 37 reaches the right-hand edge of the drum 35, head 38 simultaneously contacts limit switch 53, closing it and actuating reversible motor 52 and gear 51 to rotate gear 51 and the apparatus connected thereto in a given direction (clockwise as seen in FIGURE 3) for one-half of a revolution. The point at which this rotation stops is determined by arm 57 contacting limit switch 55 and interrupting the actuating current through switch 53 to motor 52. This brings head 38 into recording contact with the drum 35 at the left-hand edge of the drum and also brings gear 46 into engagement with driving gear 47 which thereupon starts traversing head 38 slowly to the right and head 37 slowly to the left. Upon head 37 contacting limit switch 54, the cycle is repeated by rotation of gear 51 in the opposite direction (counterclockwise) for one-half revolution.

As will be apparent, after the surface of drum 35 is once filled with reproducible traces, each trace corresponding to one transmission from transmitter 15 to receiver 16 through the surrounding media, each subsequent recording of a received trace is made in the space from which the oldest of the previously recorded traces, composited by the elongated head 60, has been erased. Accordingly, depending on the total number of traces present on the surface of drum 35 and composited by head 60, the rate at which an event must vary in travel time and/or amplitude to avoid being cancelled and thus be present in the residual or remainder trace on recording drum 80 can be predetermined within quite wide limits. That is, for a very large number of traces on the drum 35, only a few of the most nearly constant events will be cancelled, and the recording on remainder drum 80 will represent events for which the amplitude or travel time varies both rapidly and relatively slowly. On the other hand, if a somewhat smaller number of traces fill the surface of drum 35, then both constant and slowly varying travel-time or amplitude events will be largely or completely cancelled, and only the most rapidly varying events will appear in the remainder traces of drum recorder 80. Perhaps the most convenient way of choosing the compositing or averaging interval within which events to be cancelled must remain constant is by providing a plurality of sets of gears 47, 48 of different ratios for the drive of lead screws 38, 39 from drum 35.

The calibration or initial setting of this recorder to produce cancellation is done quite simply. With transmitter 15 and receiver 16 lowered into a position in a well where logging is to be started, the logging instrument is held stationary in the well while recording drum 35 continues running. When the surface of drum 35 has been filled with traces for which all event amplitudes and travel times are constant, attenuator 73 is adjusted until the output of amplifier 79 is a minimum. Thereafter, continued recording during movement of the transmitter and receiver through a wellbore results in cancellation of all events for which the travel time and amplitude continue to remain constant, while events for which the amplitude and/or travel time vary with source-receiver movement are indicated on recorder 80. A further advantage of this recording system is that, with cancellation acting to reduce the amplitudes of some of the strongest received waves that have constant travel times, additional gain can be supplied by amplifier 79, without overloading and distortion, to enhance the weaker arrivals of varying travel time, which may otherwise have been obscured.

In order to avoid loss of any received-wave data, the recorder 71 provides a record or display in which none of the received waves is cancelled. Similarly, recorder 75 provides a record of the waves which were removed in the differential recording process and thus represents the difference between display 71 and display 80.

The division of the surface of drum 35 into two equal segments, so that each recorded trace occupies one-half of the drum circumference is only for illustration of the mechanical principle. It could be divided into any integral number $n$ of equal segments, with $n$ equally spaced triggering cams like 62 and 63, and the spacing from recording gap 66 to the gap of reproducing head 60 being $1/n^{th}$ of the drum circumference in the direction of its rotation.

Figure 4:
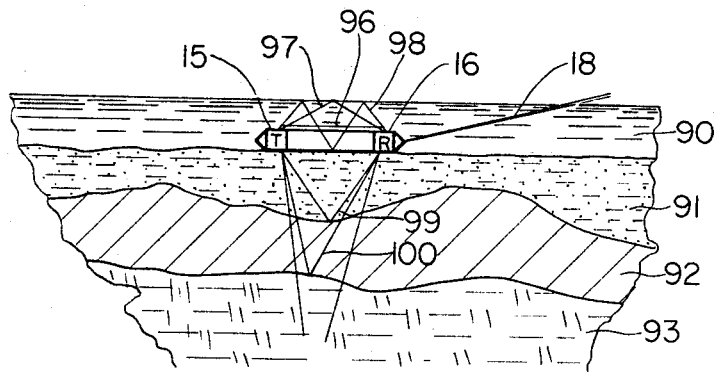
FIGURES 4, 5 and 6 are diagrammatic cross-section views showing different environments in which the recording method of the invention may find use.
Figure 5:
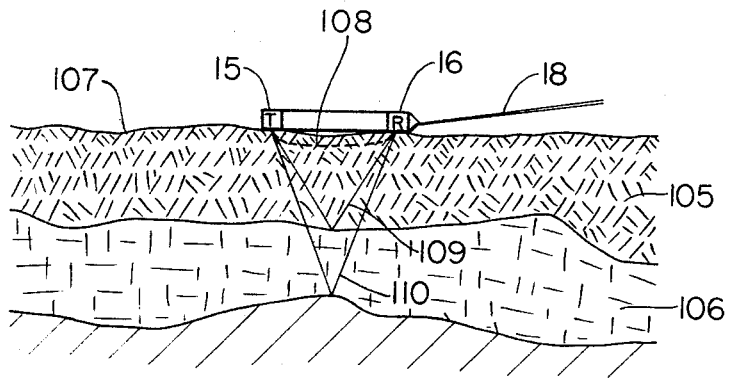
Figure 6:
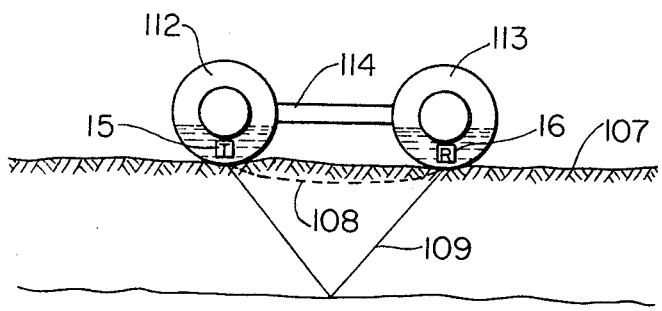

While the invention has been so far described as it applies to well logging, it may also be used in other environments such as that shown in FIGURES 4, 5, and 6. Thus, in geophysical surveying in marine or water-covered areas as shown in FIGURE 4, where a layer of water 90 of relatively constant thickness overlies sediments with layers 91, 92 and 93 of varying thickness to be determined, towing of the transmitter 15 and receiver 16 along the marine bottom by cable 18 will permit cancelling the direct water wave 96, a single surface reflection 97, a reverberation 98 between the marine surface and bottom and similar direct waves and reverberations of constant amplitude and travel time, while determining the arrivals of varying travel-times on paths 99 and 100.

Also, as in FIGURE 5, the varying thickness of a weathered layer 105 and other near-surface layer 106 may sometimes be determined by moving the transmitter 15 and receiver 16 along the ground surface 107 and cancelling the direct transmitted wave over path 108 while determining the arrivals of varying travel times on paths 109 and 110.

A particularly advantageous modification of this system may be that shown in FIGURE 6 in which the transmitter 15 and receiver 16 are surrounded by wave-coupling liquid inside large tires 112 and 113 maintained a fixed distance apart by a member 114 and establishing a rolling contact with earth surface 107 for transducers 15 and 16.

While I have described my invention in terms of the foregoing specific embodiments, details, and environmental applications, it will be understood that further modifications and uses of the invention will be apparent to those skilled in the art. The scope of the invention, therefore, should not be considered as limited to the details set forth, but is properly to be ascertained from the appended claims.

I claim:

1. The method of recording elastic waves that travel between a transmitter and a receiver via multiple paths which include at least one path for which the travel time remains substantially constant, while moving said transmitter and receiver relative to media through which there is at least one other path for which the travel time may vary and is to be determined, which method comprises the steps of:

repeatedly transmitting said elastic waves from said transmitter through said media to said receiver, recording each output signal of said receiver corresponding to one transmission as a separate reproducible trace, simultaneously reproducing a plurality of said reproducible traces corresponding to a plurality of prior transmissions with the events having constant travel times in time coincidence in said reproduced traces, summing said reproduced plurality of traces, subtracting said receiver output and said summed traces with said constant travel time events in time coincidence and of substantially equal amplitudes in said output and said summed traces, and recording the result of said subtraction step as a remainder trace positioned on a display surface as a function of said transmitter and receiver motion relative to said media.

2. The method of claim 1 in which said recording step comprises recording each receiver output signal as a corresponding magnetic trace on a magnetic recording medium, and including the further step of erasing a previously recorded trace from said medium prior to recording each successive receiver output signal.

3. The method of claim 1 including the additional steps of:

initially maintaining said transmitter and receiver stationary relative to said media while performing the steps of claim 1, adjusting the relative amplitudes of said receiver output signal and said summed traces to produce a minimum amplitude of said remainder trace, and thereafter continuing to perform the steps of claim 1 while moving said transmitter and receiver relative to said medium without altering said relative amplitude adjustment.

4. The method of claim 1 including the step of amplifying the difference signal resulting from said subtraction step by a substantial factor prior to said remainder trace recording step, whereby events that may have been obscured by said constant travel time events may be interpreted.

5. The method of claim 1 in which said transmitter and receiver are moving through a well and said media comprise the wellbore liquids and the surrounding earth formations.

6. The method of claim 1 in which said transmitter and receiver are moving along an essentially horizontal interface between the earth and an overlying fluid medium.

7. The method of claim 6 in which said overlying fluid medium is air.

8. The method of claim 6 in which said overlying fluid medium is water.

9. A system for elastic-wave recording which comprises:
   a transmitter and a receiver of elastic waves,
   means for maintaining said transmitter and receiver a fixed distance apart and moving them relative to an adjacent earth medium to which they are coupled for wave-transmission therethrough,
   trace-storage means connected to said receiver for storing a plurality of traces each corresponding to the received waves resulting from one of a corresponding sequence of wave transmissions through said medium from said transmitter,
   playback means for obtaining from said storage means a signal representing an average or composite of said plurality of traces, in time synchronism with the arrival at said receiver of a subsequent signal transmission through said medium from said transmitter,
   difference-taking means connected to said receiver and to said playback means for producing a remainder signal proportional to the difference between said average or composite signal and said subsequent signal,
   means synchronizing the transmission of signals by said transmitter with the obtaining of said average or composite signal by said playback means, and
   means responsive to said remainder signal for displaying it in visible-trace form.

10. A system as in claim 9 in which said trace-storage means comprises magnetic-recording means coupled to the output of said receiver,
    a magnetic-record-receiving surface, and means for producing a constant-speed relative motion between said recording means and said record-receiving surface.

11. A system as in claim 10 in which said relative motion is rotation about an axis and said synchronizing means produces $n$ transmissions by said transmitter per cycle of said rotation, $n$ being an integer greater than one.

12. A system as in claim 11 in which said playback means is spaced from said recording means a distance corresponding to $1/n^{th}$ of the relative motion occurring in one cycle of said rotation.

References Cited

UNITED STATES PATENTS

| | | | |
|---|---|---|---|
| 3,018,838 | 1/1962 | Hammond | 181—.5 |
| 3,081,457 | 3/1963 | Di Toro | 181—.5 |
| 3,344,395 | 9/1967 | Silverman et al. | 181—.5 |
| 3,339,176 | 8/1967 | Sparks | 181—.5 |

BENJAMIN A. BORCHELT, *Primary Examiner.*

T. H. WEBB, *Assistant Examiner.*